United States Patent

Patsch et al.

[11] 4,055,568
[45] Oct. 25, 1977

[54] DYES OF THE COUMARIN SERIES

[75] Inventors: Manfred Patsch; Christos Vamvakaris, both of Ludwigshafen, Germany

[73] Assignee: BASF Aktiengesellschaft, Ludwigshafen, Germany

[21] Appl. No.: 693,187

[22] Filed: June 7, 1976

[30] Foreign Application Priority Data

July 2, 1975   Germany ............................ 2529434
Nov. 27, 1975  Germany ............................ 2553294

[51] Int. Cl.$^2$ ......................................... C07D 419/00
[52] U.S. Cl. ...................... 260/302 H; 544/134; 544/198; 544/209; 260/293.58; 260/294.8 C; 260/306.8 D; 260/343.43; 260/455 A; 260/343.45
[58] Field of Search ............. 260/302 H, 306.8 D, 260/294.8 D, 247.1 P

[56]            References Cited
       U.S. PATENT DOCUMENTS 3,539,583  11/1970  Voltz et al. ................ 260/302 H Primary Examiner—Richard J. Gallagher
Attorney, Agent, or Firm—Keil, Thompson & Shurtleff

[57]            ABSTRACT

Dyes of the formula:

(I)

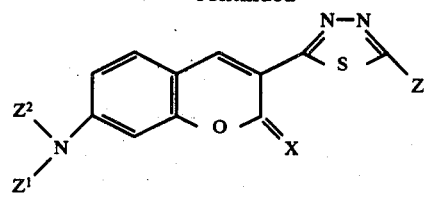

—continued in which
Z is unsubstituted or substituted alkyl, alkenyl, cycloalkyl, aralkyl, aryl or heteroaryl or a radical of the formula —OB, —SB, —SO$_2$B or —N—Z$^3$;
                                        |
                                        Z$^4$ Z$^1$, Z$^2$, Z$^3$ and Z$^4$ are hydrogen or unsubstituted or substituted alkyl, cycloalkyl, aralkyl or aryl;
Z$^1$ and Z$^2$ or Z$^3$ and Z$^4$ may together with the nitrogen form a heterocyclic ring;
Z$^1$ and Z$^2$ together with the nitrogen may be a saturated unsubstituted or substituted 5-membered or 6-membered ring condensed on in the ortho-position to the nitrogen;
B is unsubstituted or substituted alkyl, alkenyl, cycloalkyl, aralkyl, aryl or heteroaryl; and
X is imino or oxygen.

The dyes give brilliant yellow dyeings having good fastness properties on textile materials, particularly polyester materials, and in plastics.

2 Claims, No Drawings

DYES OF THE COUMARIN SERIES

The invention relates to dyes of the formula (I):

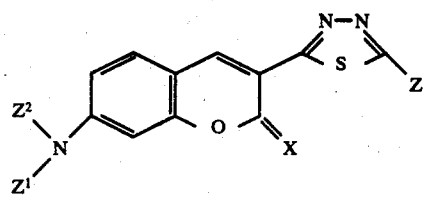

in which
Z is an optionally substituted alkyl, alkenyl, cycloalkyl, arlkyl, aryl or heteroaryl or a radical of the formula

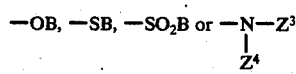

$Z^1$, $Z^2$, $Z^3$ and $Z^4$ are hydrogen or optionally substituted alkyl, cycloalkyl, aralkyl or aryl;

$Z^1$ and $Z^2$ or $Z^3$ and $Z^4$ together with the nitrogen may alternatively form a heterocyclic ring;

$Z^1$ and $Z^2$ together with the nitrogen may alternatively form a saturated optionally subsituted five-membered or six-membered ring condensed onto the coumarin ring system in the ortho-position to the nitrogen;

B is an optionally substituted alkyl, alkenyl, cycloalkyl, aralkyl, aryl or heteroaryl; and X is oxygen or imino.

The invention relates particularly to dyes of the formula (Ia):

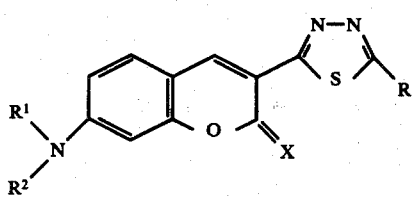

in which
R is alkyl of one to six carbon atoms, benzyl, β-hydroxyethyl, β-hydroxypropyl, ω-dialkylaminomethyl or ω-dialkylaminopropyl each of one to four carbon atoms in the alkyl, β-alkoxyethyl or β-alkoxypropyl each of one to four carbon atoms in the alkyl ω-cyanoethyl, β-carboalkoxyethyl of one to four carbon atoms in the alkoxy, β-(β'-ethylmercaptoethoxy)-ethyl, β-(β'-ethylsulfonylethoxy)ethyl, β-phenoxyethyl, cyclohexyl or phenyl, naphthyl, pyridyl, furyl or thienyl optionally substituted by chloro, bromo, methyl, ethyl, methoxy, ethoxy or cyano, or a radical of the formula

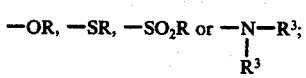

$R^1$ and $R^3$ are hydrogen, alkyl of one to four carbon atoms, alkyl of one to four carbon atoms bearing cyano, alkoxy of one to four carbon atoms, chloro, bromo, carboxyl, carboalkoxy of one to four carbon atoms in the alkoxy, carboxamide or acetoxy as a substituent, cyclohexyl, benzyl, phenylethyl or phenyl;

$R^2$ and $R^4$ are hydrogen or alkyl of one to four carbon atoms which may bear cyano, alkoxy of one to four carbon atoms, chloro, bromo, carboxyl, carboalkoxy of one to four carbon atoms in the alkoxy, carboxamide or acetoxy;

$R^1$ and $R^2$ or $R^3$ and $R^4$ together with the nitrogen may alterntively form a five-membered or six-membered saturated heterocyclic ring;

$R^2$ together with the nitrogen may alternatively be a radical condensed onto the coumarin ring system in the ortho-position to the nitrogen and having the formula:

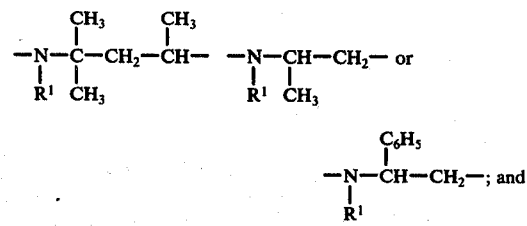

X is oxygen or imino.

Examples of substituents, other than those specifically mentioned, are:

For $R^1$, $R^2$, $R^3$ and $R^4$: methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl or β-acetoxypropyl.

$R^1$ and $R^2$ or $R^3$ and $R^4$ may together with the nitrogen be for example the radical of pyrrolidine, piperidine, mopholine, piperazine or N-methylpiperazine.

Particular industrial importance attaches to dyes of the formula (Ib):

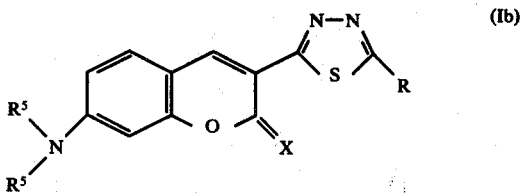

in which
$R^5$ is alkyl of one to four carbon atoms and preferably methyl or ethyl and R and X have the meanings given above. X is preferably oxygen and R is preferably unsubstituted or substituted phenyl or $SCH_3$, $SC_2H_5$, $SC_3H_7$, $SC_4H_9$, $SC_6H_{13}$, $SCH_2C_6H_4CH_3$, $SCH_2C_6H_4Cl$, $SCH_2C_6H_5$, $SCH_2CH_2OH$, $SCH_2CH_2N(CH_3)_2$, $SCH_2CH_2N(C_2H_5)_2$ or $S(CH_2)_3N(CH_3)_2$.

The new fluorescent dyes have high brilliance and the hues lie in the yellowish green region. They are suitable for dyeing polyamide, cellulose ester, acrylonitrile polymer and particularly polyester textile material and for the mass coloration of plastics. Dyes which sublime easily are also suitable for transfer printing.

Dyes according to the invention are very strong (of high color strength and high exhaustion of the dye liquor) and give dyeings having good fastness to light and thermofixation. Tinctorial behavior is very good, for example not dependent on the pH. Dyes according to the invention may also be used for coloring daylight fluorescent pigments.

Compounds of the formula (I) may be prepared by:
a. condensing a compound of the formula (II):

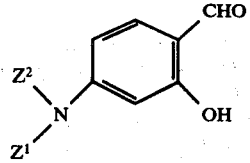

with a compound of the formula (III):

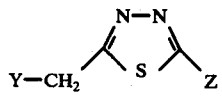

in which
Y is cyano, carbamoyl, or carboalkoxy of one to four carbon atoms in the alkoxy, by the method of German Pat. No. 1,098,125 or German Laid-Open Application DOS No. 2,011,500; or
b. cyclizing a compound of the formula (IV):

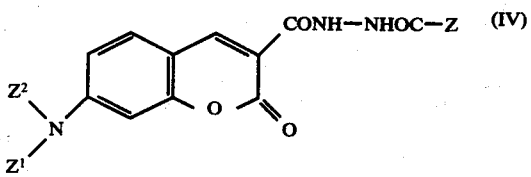

by the method of German Pat. No. 1,134,080; or
c. cyclizing a compound of the formula (V):

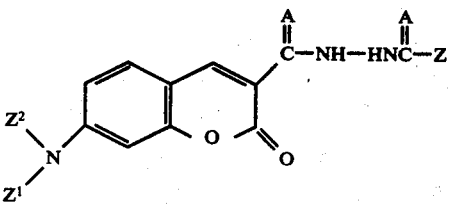

in which one A is sulfur and the other A is oxygen, by the method of German Pat. No. 1,249,873.

Accoording to method (a) there are first obtained the imino compounds (X=NH) which may be then hydrolyzed to the oxo compounds (X=O).

The process for the production of the dyes according to the invention does not differ from the prior art methods, the reactions proceeding analogouosly.

Compounds of the formula (IV) are accessible for example by the reaction of a compound of the formula (II) with a compound of the formula (VI):

NC—CH$_2$CONH—NHCOZ      (VI)

Compounds of the formula (III) are accessible for example analogously to the methods described in Chem. Ber. 96, (1963), 1059.

Instead of compounds of the formula (III) with Z being —OB or —SB, there may be used precursors of the formula:

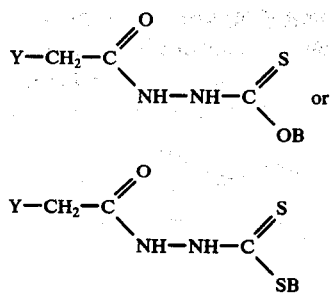

which may be obtained for example as follows:

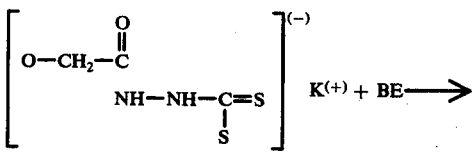

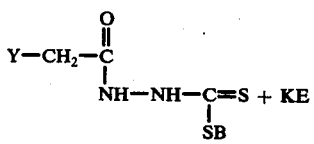

E is a radical capable of being eliminated as an anion.

The following Examples illustrate the invention; parts and percentages are by weight unless otherwise specified.

EXAMPLE 1

7 parts of 4-diethylaminosalicylaldehyde in 50 parts by volume of isopropanol is boiled under reflux with 9 parts of ethyl 2-[5'-phenylthiadiazolyl-(2')]-acetate and 2 parts by volume of pyrrolidine for 15 minutes and then cooled and suction filtered.

10 parts (73% of theory) of 3-[5'-phenylthiadiazolyl-(2')]-7-diethylaminocoumarin is obtained having a melting point of from 270° to 272° C (recrystallized from dimethylformamide).

EXAMPLE 2

Using 4-dimethylaminosalicylaldehyde instead of 4-diethylaminosalicylaldehyde the procedure of Example 1 is repeated. 3-[5'-phenylthiadiazolyl-(2')]-7-dimethylaminocoumarin is obtained in a yield of 55% of theory and with a melting point of from 286° to 290° C.

EXAMPLE 3

19.3 parts of diethylaminosalicylaldehyde and 20.1 parts of 2-cyanomethyl-5-phenylthiadiazole are boiled under reflux in 100 parts by volume of isopropanol with 5 parts by volume of pyrrolidine for 15 minutes. After cooling the 3-[5'-phenyldiazolyl-(2')]-7-diethylamino-2-iminocoumarin is suction filtered in a yield of 79%; its melting point is 228° to 230° C.

4.6 parts of the iminocoumarin in 40 parts by volume of ethanol is boiled for 1 hour with 10 parts by volume of water and 10 parts by volume of concentrated hydrochloric acid. After cooling the product is suction filtered and the filtered material is suspended in water, made alkaline with ammonia and again suction filtered. 4 parts of 3-[5'-phenylthiadiazolyl-(2')]-7-diethylaminocoumarin (87% of theory) is obtained; melting point 272° to 275° C.

The compounds set out in Table 1 are obtained analogously to Example 3:

[Structure: 7-amino-coumarin with thiadiazolyl-phenyl substituent, R¹R²N- at 7-position, R³, R⁴ on phenyl]

| Example | R¹ | R² | R³ | R⁴ |
|---|---|---|---|---|
| 4 | —CH₃ | —CH₃ | H | H |
| 5 | —C₂H₅ | —C₂H₅ | 4-Cl | H |
| 6 | —C₂H₅ | —C₂H₅ | 2-Cl | H |
| 7 | —CH₃ | —CH₃ | 4-Cl | H |
| 8 | —CH₃ | —CH₃ | 2-Cl | H |
| 9 | —C₂H₅ | —C₂H₅ | 2-Cl | 4-Cl |
| 10 | —CH₃ | —CH₃ | 2-Cl | 4-Cl |
| 11 | —C₂H₅ | —C₂H₅ | 2-Cl | 6-Cl |
| 12 | —CH₃ | —CH₃ | 2-Cl | 6-Cl |
| 13 | —CH₃ | —CH₃ | 4-CH₃ | H |
| 14 | —C₂H₅ | —C₂H₅ | 4-CH₃ | H |
| 15 | —CH₃ | —CH₃ | 4-OCH₃ | H |
| 16 | —C₂H₅ | —C₂H₅ | 4-OCH₃ | H |
| 17 | —CH₃ | —CH₃ | 4-OC₂H₅ | H |
| 18 | —C₂H₅ | —C₂H₅ | 4-OC₂H₅ | H |
| 19 | —CH₃ | —CH₃ | 2-OCH₃ | H |
| 20 | —C₂H₅ | —C₂H₅ | 2-OCH₃ | H |
| 21 | —CH₃ | —CH₃ | 4-N(CH₃)CH₃ | H |
| 22 | —C₂H₅ | —C₂H₅ | 4-N(CH₃)CH₃ | H |
| 23 | —C₂H₅ | —C₂H₅ | 4-NO₂ | H |
| 24 | —CH₃ | —CH₃ | 4-NO₂ | H |
| 25 | —CH₃ | —CH₃ | 4-CN | H |
| 26 | —C₂H₅ | —C₂H₅ | 4-CN | H |
| 27 | —CH₃ | —CH₃ | 4-CO₂C₂H₅ | H |
| 28 | —C₂H₅ | —C₂H₅ | 4-CO₂C₂H₅ | H |

EXAMPLE 29

13.3 parts of phosphorus pentasulfide is added to 7 parts of N-[7-diethylaminocoumaryl-(3')]-N'-butyrylhydrazine in 60 parts by volume of pyridine. The whole is heated for 1 hour at 60° C and for another 5 hours under reflux and then allowed to cool. The reaction mixture has 60 parts by volume of ethanol added to it and the whole is carefully stirred into ice-water. One hour later the precipitate is suction filtered. 6.5 parts (95% of theory) of 3-[5'-propylthiadiazolyl-(2')]-7-diethylaminocoumarin having a melting point of more than 300° C is obtained.

Further coumarin compounds, which may be prepared analogously, are set out in the following Table:

[Structure: 7-amino-coumarin with thiadiazolyl-R² substituent]

| Ex. | R¹ | R² |
|---|---|---|
| 30 | —CH₃ | propyl |
| 31 | —C₂H₅ | isopropyl |
| 32 | —CH₃ | butyl |
| 33 | —C₂H₅ | butyl |
| 34 | —CH₃ | isobutyl |
| 35 | —C₂H₅ | isobutyl |

-continued

| Ex. | R¹ | R² |
|---|---|---|
| 36 | —CH₃ | —CH₃ |
| 37 | —C₂H₅ | —CH₃ |
| 38 | —CH₃ | —C₂H₅ |
| 39 | —C₂H₅ | —C₂H₅ |
| 40 | —CH₃ | —CH₂—CH₂—O—CH₂—CH₂ |
| 41 | —C₂H₅ | —CH₂—CH₂—O—CH₂—CH₃ |
| 42 | —CH₃ | —CH₂—C₆H₅ |
| 43 | —C₂H₅ | —CH₂—C₆H₅ |
| 44 | —CH₃ | —CH₂—CH₂—O—CH₂—CH₂—S—C₂H₅ |
| 45 | —C₂H₅ | —CH₂—CH₂—O—CH₂—CH₂—S—C₂H₅ |
| 46 | —CH₃ | —CH₂—CH₂—O—CH₂—CH₂—SO₂—C₂H₅ |
| 47 | —C₂H₅ | —CH₂—CH₂—O—CH₂—CH₂—SO₂—C₂H₅ |
| 48 | —CH₃ | —CH₂—CH₂—O—C₆H₅ |
| 49 | —C₂H₅ | —CH₂—CH₂—O—C₆H₅ |
| 50 | —CH₃ | —CH₂—CH₂—O—C₆H₁₁ |
| 51 | —C₂H₅ | —CH₂—CH₂—O—C₆H₁₁ |

EXAMPLE 52

10 parts of pyrrolidine and then at ambient temperature 20 parts of phosphorus pentasulfide are added to 11.4 parts of N-[7-diethylaminocoumaryl-(3')]-N'-isonicotinylhydrazine in 50 parts of pyridine. The whole is stirred for 1 hour at 60° C and then the temperature is gradually raised to 110° C. The whole is stirred for another 5 hours at this temperature, then cooled, 100 parts of ethanol is added and the reaction mixture is poured into 2000 parts off ice-water. The whole is stirred for another 2 hours and then the precipitate is suction filtered. 9.3 parts (82% of theory) of 3-[5'-(pyridyl-(4)-thiadiazolyl-(2')]-7-diethylamino-coumarin is obtained; it has a melting point of 280° to 283° C after having been recrystallized from dimethylformamide.

The compounds set out in Table 3 are obtained analogously:

[Structure: 7-amino-coumarin with thiadiazolyl-R² substituent]

| Example | R¹ | R² |
|---|---|---|
| 53 | —CH₃ | 4-pyridyl |

-continued

[Structure: coumarin with R¹R²N- at 7-position and thiadiazolyl-R² at 3-position]

| Example | R¹ | R² |
|---|---|---|
| 54 | —C₂H₅ | furyl |
| 55 | —CH₃ | " |
| 56 | —C₂H₅ | thienyl |
| 57 | —CH₃ | " |

EXAMPLE 58

20 parts by volume of 32% hydrochloric acid is added to a solution of 19.3 parts of 4-diethylaminosalicylaldehyde and 20.1 parts of 5-phenyl-3-cyanomethylthiadiazole in 80 parts by volume of dimethylformamide and the whole is stirred for 1 hour at 100° C. A crystal mash is formed which is adjusted with 2N caustic soda solution at 80° C to a pH of from 4 to 5, then cooled, suction filtered, washed with water and dried. 30 parts (79.5% of theory) of 3-[5'-phenylthiadiazolyl-(2'-]-7-diethylaminocoumarin is obtained.

EXAMPLE 59

7-diethylamino-3-[-5'-acetylaminothiadiazolyl-(2')]-coumarin 2 parts by volume of pyrrolidine is added to 7.8 parts of 4-diethylaminosalicylaldehyde and 9.6 parts of ethyl 2-[5'-acetylaminothiadiazolyl-(2')]-acetate in 70 parts by volume of isopropanol and boiled under reflux for 30 minutes. After cooling the reaction product is suction filtered and washed with isopropanol. 11.3 parts of the dye is obtained having a melting point of more than 300° C.

EXAMPLE 60

7-diethylamino-3-[5'-aminothiadiazole-(2')]-coumarin 7.2 parts of the dye prepared according to Example 59 is boiled under reflux in 70 parts by volume of ethanol while passing in hydrochloric acid for 4 hours. The product is poured into icewater, buffered with sodium acetate and the reaction product is suction filtered. 6 parts (95% of theory) of the dye is obtained having a melting point of 228° to 232° C.

EXAMPLE 61

7-diethylamino-3-[5'aminophenylthiadiazolyl-(2')]-coumarin 13.5 parts of 4-diethylaminosalicylaldehyde and 18.8 parts of 2-[5'-phenylaminothiadiazolyl-(2')]-acetic acid ethyl ester are boiled under reflux in 200 parts by volume of isopropanol and 5 parts by volume of pyrrolidine for 30 minutes and then cooled. The reaction product is suction filtered. 24.1 parts of the dye is obtained having a melting point of 268° to 272° C.

EXAMPLE 62

7-diethylamino-3-[5'-acetylaminophenylthiadiazolyl-(2')]-coumarin buffered 9.8 parts of the dye obtained in Example 61 is gently boiled under reflux for 1 hour in 50 parts by volume of acetic anhydride which contains 1 drop of concentrated sulfuric acid. The reaction mixture is then poured onto ice, stirred for another 3 hours and the precipitated reaction product is suction filtered. 10.5 parts (96.7% of theory) of dye is obtained having a melting point of 245° to 248° C

EXAMPLE 63

7-diethylamino-3-[5'-N-phenyl-N-(2''-isopropylamino-4''-phenyltriazinyl-(6''))-aminothidiazolyl-(2')]-coumarin 11.8 parts of the product prepared according to Example 61 is heated under reflux with 7.8 parts of 2-isopropylamino-4-phenyl-6-chlorotriazine and 20 parts by volume of o-dichlorobenzene until escape of hydrogen chloride subsides.

After the reaction is over the whole is allowed to cool to about 140° C and 30 parts by volume of dimethylformamide is added so that the reaction product passes into solution. The whole is boiled for 30 minutes under reflux. The reaction mixture is cooled and the compound is isolated by a conventional method. 13.2 parts (72.8% of theory) of the dye having a melting point of 267° to 270° C is obtained.

EXAMPLE 64

7-dimethylamino-3-[5'-acetylaminothiadiazolyl-(2')]-coumarin 4-dimethylaminosalicylaldehyde is used and otherwise the procedure described in Example 59 is followed. The new dye is obtained in a yield of 75%.

EXAMPLE 65

7-dimethylamino-3-[5'-phenylaminothiadiazolyl-(2')]-coumarin 4-dimethylaminosalicylaldehyde is used and otherwise the procedure described in Example 61 is used. The new dye is obtained in a yield of 85%.

EXAMPLE 66

7-dimethylamino-3-[5'-methylmercaptothiadiazolyl-(2')]-coumarin:

12.2 parts of the methyl ester of dithiocarbazic acid and 19.6 parts of the hydrochloride of the diethyl ester of iminomalonic acid are boiled under reflux for 1 hour in 100 parts by volume of isopropanol. The cooled solution then has 19 parts of 4-diethylaminosalicylaldehyde, 10 parts by volume of pyrrolidine and 50 parts by volume of isopropanol added to it and it is heated under reflux for 30 minutes. The cooled reaction mixture is suction filtered, and washed with isopropanol and then with water. 24.5 parts (70% of theory) of the dye is obtained having a melting point of 222° to 225° C.

EXAMPLES 67 to 70

Other esters of dithiocarbazic acid are used, the precedure otherwise being as described in Example 66. The corresponding alkyl-(aryl)mercaptothiadiazolyl-coumarins are obtained:

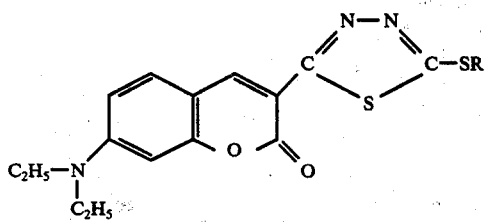

| Example | R | Melting point | Color on PES |
|---|---|---|---|
| 67 | —C$_2$H$_5$ | 206° to 210° C | greenish yellow |
| 68 | —CH$_2$—CH=CH$_2$ | 180° to 182° C | greenish yellow |
| 69 | —CH$_2$—C$_6$H$_5$ | 155° to 158° C | greenish yellow |
| 70 | —CH$_2$—⟨C$_6$H$_4$⟩—CH$_3$ | 160° to 162° C | greenish yellow |

EXAMPLE 71

7-diethylamino-3-[5'-cyclohexyloxythiadiazolyl-(2')]-coumarin 7.7 parts of 4-diethylaminosalicylaldehyde and 10.8 parts of ethyl 2- 5'-cyclohexyloxythiadiazolyl-(2') -acetate are boiled under reflux in 50 parts by volume of isopropanol with 5 parts by volume of piperidine for 30 minutes. The reaction mixture is cooled and the precipitate is suction filtered. 13 parts of dye (81% of theory) is obtained; it has a melting point of 175° to 177° C.

EXAMPLE 72

7-diethylamino-3-[5'-n-butyloxythiadiazolyl-(2')]-coumarin

Ethyl 2-[5'-n-butyloxythiadiazolyl-(2')]-acetate is used instead of ethyl 2-[5'-cyclohexyloxythiadiazolyl-(2')]-acetate but in other respects the procedure described in Example 71 is followed. 11.9 parts (80% of theory) of the dye is obtained; it has a melting point of 187° to 190° C.

The dyes identified in the following Table by specifying their substituents may also be prepared by methods analogous to those described in the foregoing Examples:

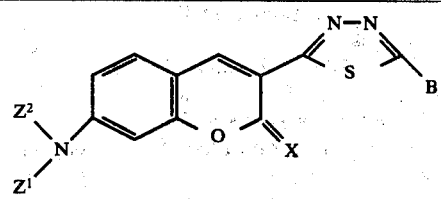

| Ex. | Z$^1$ | Z$^2$ | X | B | Hue |
|---|---|---|---|---|---|
| 73 | C$_3$H$_7$ | C$_3$H$_7$ | O | SCH$_3$ | brilliant yellow |
| 74 | C$_4$H$_9$ | C$_4$H$_9$ | O | " | " |
| 75 | —CH$_2$—CH$_2$—O—CH$_2$—CH$_2$— | | O | " | " |
| 76 | —CH$_2$—(CH$_2$)$_2$—CH$_2$— | | O | " | " |
| 77 | —CH$_2$—(CH$_2$)$_3$—CH$_2$— | | O | " | " |
| 78 | —CH$_2$—(CH$_2$)$_3$—CH$_2$— | | NH | " | " |
| 79 | CH$_3$ | | O | " | " |
| 80 | CH$_3$ | —(CH$_2$)$_3$—⟨Cl-C$_6$H$_4$⟩ | O | " | " |
| 81 | C$_2$H$_5$ | C$_2$H$_5$ | O | NH—C(=O)—CH$_2$—OC$_6$H$_5$ | " |
| 82 | C$_2$H$_5$ | C$_2$H$_5$ | NH | N(C$_6$H$_5$)—C(=O)—C$_4$H$_9$ | " |
| 83 | C$_2$H$_5$ | C$_2$H$_5$ | O | triazinyl(NHC$_4$H$_9$)(NHC$_4$H$_9$) with HN | " |

-continued

| Ex. | Z¹ | Z² | X | B | Hue |
|---|---|---|---|---|---|
| 84 | —CH₂—CH₂—O—CH₂—CH₂— | | O | ![N(C₆H₅)(COCH₃)] | " |
| 85 | —CH₂—CH₂—O—CH₂—CH₂— | | O | O—C₄H₉ | yellow |
| 86 | —CH₂—(CH₂)₃—CH₂— | | O | O—C₄H₉ | " |
| 87 | —CH₂—(CH₂)₃—CH₂— | | NH | O—C₆H₁₁ | " |
| 88 | CH₃ | 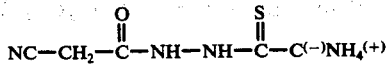 | NH | O—C₄H₉ | " |

EXAMPLE 89

6-diethrlamino-3-[5'-methylmercaptothiadiazolyl-(2')]-coumarin 4.8 parts by volume of dimethyl sulfate is added dropwise at ambient temperature to 9.6 parts of the ammonium salt of the dithiocarbazic acid derivative of the formula:

$$NC-CH_2-\underset{\underset{O}{\|}}{C}-NH-NH-\underset{\underset{S}{\|}}{C}-C^{(-)}NH_4^{(+)}$$

in 50 parts by volume of dimethylformamide and the whole is then stirred for 1 hour at 40° C.

9.7 parts of 4-diethylaminosalicylaldehyde and 20 parts by volume of concentrated hydrochloric acid are then added and the whole is heated under reflux for 15 minutes. The cooled reaction mixture is suction filtered and washed with isopropanol.

9.4 parts of the dye is obtained; it has a melting point of 218° to 221° C.

EXAMPLE 90

7-diethylamino-3-[5'-methylsulfonylthiadiazolyl-(2')]-coumarin 17 parts by volume of 30% hydrogen peroxide is added within half an hour to 17.4 parts of the dye from Example 66 or 89 in 50 parts by volume of glacial acetic acid while heating under reflux. The reaction mixture is boiled for another 30 minutes and then cooled and poured into ice-water. The whole is stirred for another hour. The precipitated reaction product is suction filtered and washed with isopropanol. The dye obtained has a melting point of 205° to 209° C.

EXAMPLE 91

7-diethylamino-3-[5'-allylsulfonylthiadiazolyl-(2')]-coumarin

The dye from Example 68 is used and otherwise the procedure described in Example 90 is adopted. The corresponding dye having a CH₂=CH—CH₂—SO₂ group is obtained; it has a melting point of 152° to 155° C.

The dyes identified in the following Table may also be obtained by methods corresponding to those described above:

| Example | Z |
|---|---|
| 92 | S CH₂ CH₂ N (CH₃)₂ |
| 93 | S CH₂ CH₂ N (C₂H₅)₂ |
| 94 | S CH₂ CH₂ N (C₄H₉)₂ |
| 95 | S (CH₂)₃ N (C₂H₅)₂ |
| 96 | S C₄H₉ |
| 97 | S C₆H₁₃ |
| 98 | O C₂H₅ |

We claim:

1. A compound of the formula wherein:
R is phenyl, phenyl substituted by chloro, methyl, methoxy or cyano; C₁ to C₆ alkylmercapto; benzylmercapto; tolylmercapto; chlorobenzylmercapto, hydroxyethylmercapto; β-di-C₁ to C₄ alkylaminoethylmercapto; or γ-di-C₁ to C₄ alkylaminopropylmercapto;
R⁵ is alkyl of one to four carbon atoms; and
X is oxygen or imino.

2. A compound of the formula claimed in claim 1 wherein:
R is phenyl or methylmercapto;
R⁵ is ethyl; and
X is oxygen.

* * * * *